United States Patent [19]
Chang

[11] Patent Number: 5,367,743
[45] Date of Patent: Nov. 29, 1994

[54] TELESCOPIC HANDLE FOR LUGGAGE CARTS

[76] Inventor: Fu-Jung Chang, 8-5 Fl., No. 191, Fu Hsing N. Rd., Taipei, Taiwan, Prov. of China

[21] Appl. No.: 38,790

[22] Filed: Mar. 29, 1993

[51] Int. Cl.⁵ .................................... B62B 1/00
[52] U.S. Cl. .......................... 16/115; 280/47.315; 403/109; 403/377
[58] Field of Search .............. 16/115; 15/144.4; 403/109, 377; 280/47.315, 47.371, 655, 655.1; 81/177.2; 190/18

[56] References Cited

U.S. PATENT DOCUMENTS

| | | | |
|---|---|---|---|
| 3,038,567 | 6/1962 | Poddig et al. | 403/377 |
| 4,577,877 | 3/1986 | Kassai | 280/47.371 |
| 4,708,297 | 11/1987 | Boers | 403/377 |
| 4,733,882 | 3/1988 | Kassai | 280/655.1 |
| 5,127,664 | 7/1992 | Cheng | 280/655 |

FOREIGN PATENT DOCUMENTS

| | | | |
|---|---|---|---|
| 4022394 | 1/1992 | Germany | 280/47.371 |
| 4183673 | 6/1992 | Japan | 280/655 |
| 4183674 | 6/1992 | Japan | 280/655 |
| 4183675 | 6/1992 | Japan | 280/655 |
| 168984 | 9/1934 | Switzerland | 403/108 |
| 639177 | 10/1983 | Switzerland | 403/109 |

*Primary Examiner*—Lowell A. Larson
*Assistant Examiner*—Donald M. Gurley
*Attorney, Agent, or Firm*—Merchant, Gould, Smith, Edell, Welter & Schmidt

[57] ABSTRACT

A telescopic handle has a first tube with two slots and a second tube with two holes. A locking element has a first section attached in the first tube and a larger second section sited in the second tube. The second section of the locking element has two holes. A passage with a first section and a larger second section is formed through the locking element. A plunger has a first section insertable through the first section of the passage, a second section with a cross-sectional profile marginally smaller than that of the second section of the passage and a third section with a cross-sectional profile smaller than that of the second section of the passage. A spring is compressed between the second section of the plunger and a nut attached to the third section of the plunger. A pulling element links a bolt, insertable through the slots, to the first section of the plunger. Two balls are sited in the holes formed through the locking element. The plunger is spring-biased so that the second section of the plunger aligns with the holes formed through the locking element for pushing the balls partially into the holes formed in the second tube, thereby retaining the first tube relative to the second tube. The plunger is moveable, by pulling the bolt, so that the third section of the plunger aligns with the holes formed through the locking element for allowing the balls to be pushed partially into the holes formed through the locking element, thereby allowing the first tube to slide relative to second tube.

6 Claims, 5 Drawing Sheets

TELESCOPIC HANDLE FOR LUGGAGE CARTS

BACKGROUND OF INVENTION

1. Field of Invention

The present invention relates to luggage carts and, more particularly, to a telescopic handle for luggage carts.

2. Related Prior Art

Generally, luggage carts employ telescopic handles in view of variability and convenience. The telescopic handles are in an extended position when the luggage carts are in operation for carrying luggage. The telescopic handles are converted to a retracted position when the luggage carts are not in operation. With the telescopic handles retained in retracted position, the dimensions of the luggage carts are reduced. It is relatively convenient to carry/store luggage carts with reduced dimensions. The telescopic handles can be converted to a position between the extended position and the retracted position so that they have proper lengths matching various heights of users.

Telescopic handles for luggage carts each have several tubes, e.g., three tubes including a first tube slidably received in a second tube slidably received in a third tube. Conventionally, the first tube has a first end attached to a grip and a second end formed with a hole. The second tube has a first end formed with a first hole and a second end formed with a second hole. The third tube has a first end formed with a first hole. A first elastic strip formed with a boss is attached in the first tube near the second end of the same so that the boss formed thereon is aligned to the hole formed through the same. A second elastic strip formed with a boss is attached in the second tube near the second end of the same so that the boss formed thereon is aligned to the second hole formed through the same. A lever formed with a protrusion is mounted on the third tube near the first end of the same so that the protrusion is aligned to the hole formed through the third tube.

The first tube is retained in position with respect to the second tube when the boss is inserted through the hole formed through the first tube and received in the first hole formed through the second tube. The second tube is retained in position with respect to the third tube when the boss is inserted through the second hole formed through the second tube and received in the hole formed through the third tube. The second tube is slidable in the third tube when the boss is pressed out of the hole formed through the third tube by pressing the lever. The second tube is insertable in the third tube so that the protrusion formed on the lever pushes the boss formed on the first elastic strip out of the first hole formed through the second tube. Thus, the first tube is slidable in the second tube.

Sometimes, it is desired to adjust the length of the above-mentioned telescopic handle when the luggage cart is in operation. In this case, users have to bend their bodies so that their hands can reach the lever formed on the third tube of the above-mentioned telescopic handle. However, elderly users may not easily bend down and may get hurt by doing so. Therefore, the present invention is intended to solve the above-mentioned problem.

SUMMARY OF INVENTION

It is an object of the present invention to provide a telescopic handle for carts, having at least a first tube having two slots longitudinally formed therethrough and a second tube having two holes formed therethrough. A locking element has a first section attached in the first tube and a relatively large second section sited in the second tube. The second section of the locking element has two holes transversely formed therethrough. The holes formed through the locking element has a diameter greater than that of the holes formed through the second tube. A passage is axially formed through the locking element and has a first section and a relatively large second section. A plunger has a first section being insertable through the first section of the passage, a second section having a cross-sectional profile being marginally smaller than that of the second section of the passage and a third section having a cross-sectional profile being smaller than that of the second section of the passage. A nut is attached to the third section of the plunger. A spring is mounted on the third section of the plunger so that the spring is compressed between the second section of the plunger and the nut. A bolt is insertable through the slots. A pulling element links the bolt to the first section of the plunger. Two balls are respectively sited in the holes formed through the locking element and has a diameter greater than the wall thickness of the second section of the locking element. The plunger is biasable, by means of the spring, to a first position relative to the locking element so that the second section of the plunger is aligned with the holes formed through the locking element for pushing the balls partially into the holes formed in the second tube, thereby retaining the first tube relative to the second tube. The plunger is moveable, by pulling the bolt upwards, to a second position with respect to the locking element so that the third section of the plunger is aligned with the holes formed through the locking element for allowing the balls to be pushed partially into the holes formed through the locking element, thereby allowing the first tube to be further inserted into the second tube.

It is another object of the present invention to provide a telescopic handle having a first tube, a second tube and a third tube. The first tube has two slots longitudinally formed therethrough near a first end thereof and two holes formed therethrough near a second end thereof. The second tube has two holes formed therethrough. The third tube has two holes formed therethrough. A first locking element has a first section having two recesses transversely formed therein and a relatively large second section having two holes transversely formed therethrough. The holes formed through the first locking element has a diameter greater than that of the holes formed through the second tube. A passage is axially formed through the first locking element and has a first section and a relatively large second section. A first plunger has a first section being insertable through the first section of the passage formed through the first locking element, a second section comprising a cross-sectional profile being marginally smaller than that of the second section of the passage formed through the first locking element and a third section having a cross-sectional profile being smaller than that of the second section of the passage formed through the first locking element. A first nut is attached to the third section of the first plunger. A first spring is mounted on the third section of the first plunger so that the first spring is compressed between the second section of the first plunger and the first nut.

A first bolt is insertable through the slots formed through the first tube. The first pulling element links the first bolt to the first section of the first plunger. Two first balls are respectively sited in the holes formed through the first locking element and has a diameter greater than the wall thickness of the second section of the first locking element. A second locking element has a first section having two recesses transversely formed therein and a relatively large second section having two holes transversely formed therethrough. The holes formed through the second locking element has a diameter greater than that of the ball-receiving holes formed through the second tube. A passage is axially formed through the second locking element and has a first section and a relatively large second section. A second plunger has a first section being insertable through the first section of the passage formed through the second locking element and a second section having a cross-sectional profile being marginally smaller than that of the second section of the passage formed through the second locking element. A second nut is attached to the first section of the second plunger. A second spring is mounted on the first section of the second plunger so that the second spring is compressed between the second section of the second plunger and the second nut. Two second balls are respectively sited in the holes formed through the second locking element and has a diameter greater than the wall thickness of the second section of the second locking element. The first plunger is biasable, by means of the first spring, to a first position relative to the first locking element so that the second section of the first plunger is aligned with the holes formed through the first locking element for pushing the first balls partially into the ball-receiving holes formed in the second tube, thereby retaining the first tube relative to the second tube. The first plunger is moveable, by pulling the bolt upwards, to a second position with respect to the first locking element so that the third section of the first plunger is aligned with the holes formed through the first locking element for allowing the first balls to be pushed partially into the holes formed through the first locking element, thereby allowing the first tube to be further inserted into the second tube. The second plunger is biasable, by means of the second spring, to a first position relative to the second locking element so that the second section of the second plunger is aligned with the holes formed through the second locking element for pushing the second balls partially into the holes formed in the third tube, thereby retaining the second tube relative to the third tube. The second plunger is moveable, by means of the first plunger, to a second position with respect to the second locking element so that the first section of the second plunger is aligned with the holes formed through the second locking element for allowing the second balls to be pushed partially into the holes formed through the second locking element, thereby allowing the second tube to be further inserted into the third tube.

For a better understanding of the present invention and objects thereof, a study of the detailed description of the embodiments described hereinafter should be made in relation to the accompanying drawings.

DETAILED DESCRIPTION OF PREFERRED EMBODIMENT

The present invention will be described in detail with reference to FIGS. 1 through 5 of the drawings showing the preferred embodiment thereof.

Figure 1:
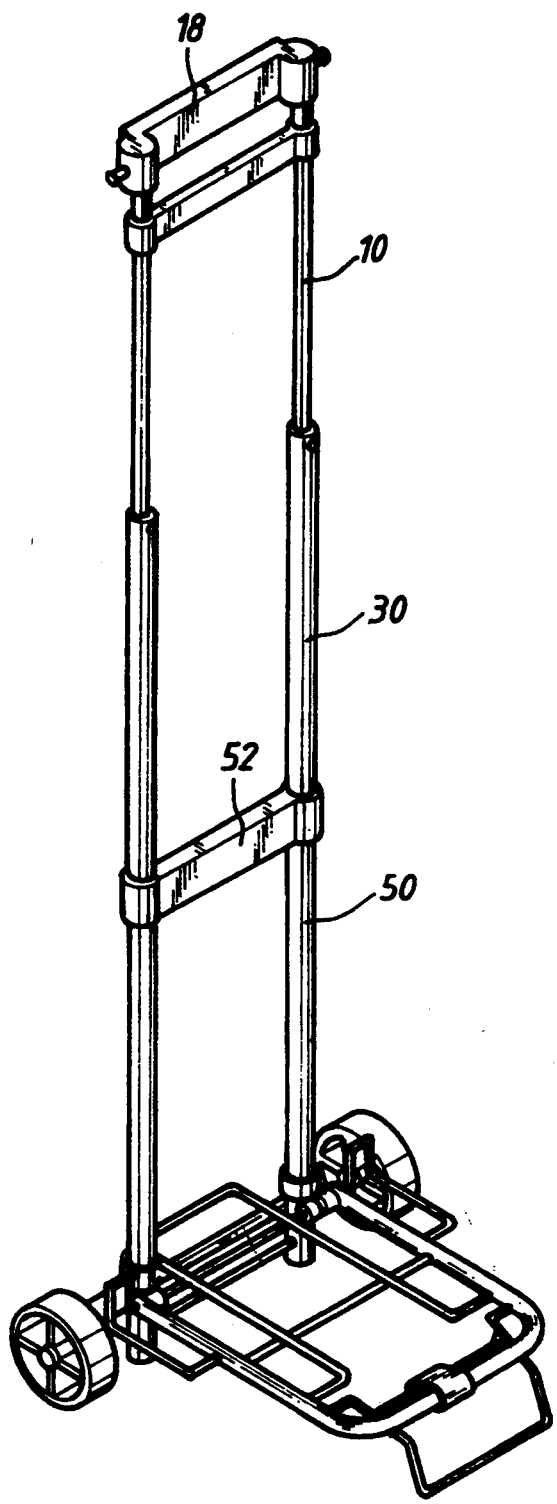
FIG. 1 is a perspective view of a luggage cart employing two telescopic handles in accordance with the preferred embodiment of the present invention.

Initially referring to FIG. 1 of the drawings, a luggage cart employs two telescopic handles in accordance with the preferred embodiment of the present invention. The telescopic handles each consist of a first tube 10, a second tube 30 and a third tube 50. The first tubes 10 each have a first end and a second end. The first ends of the first tubes 10 are respectively received in two cap-shaped portions formed on two ends of an upper handle grip 18. The third tubes 50 are respectively inserted through two sleeve-shaped portions formed on two ends of a lower handle grip 52. Thus, the two telescopic handles are joined together.

Figure 3:
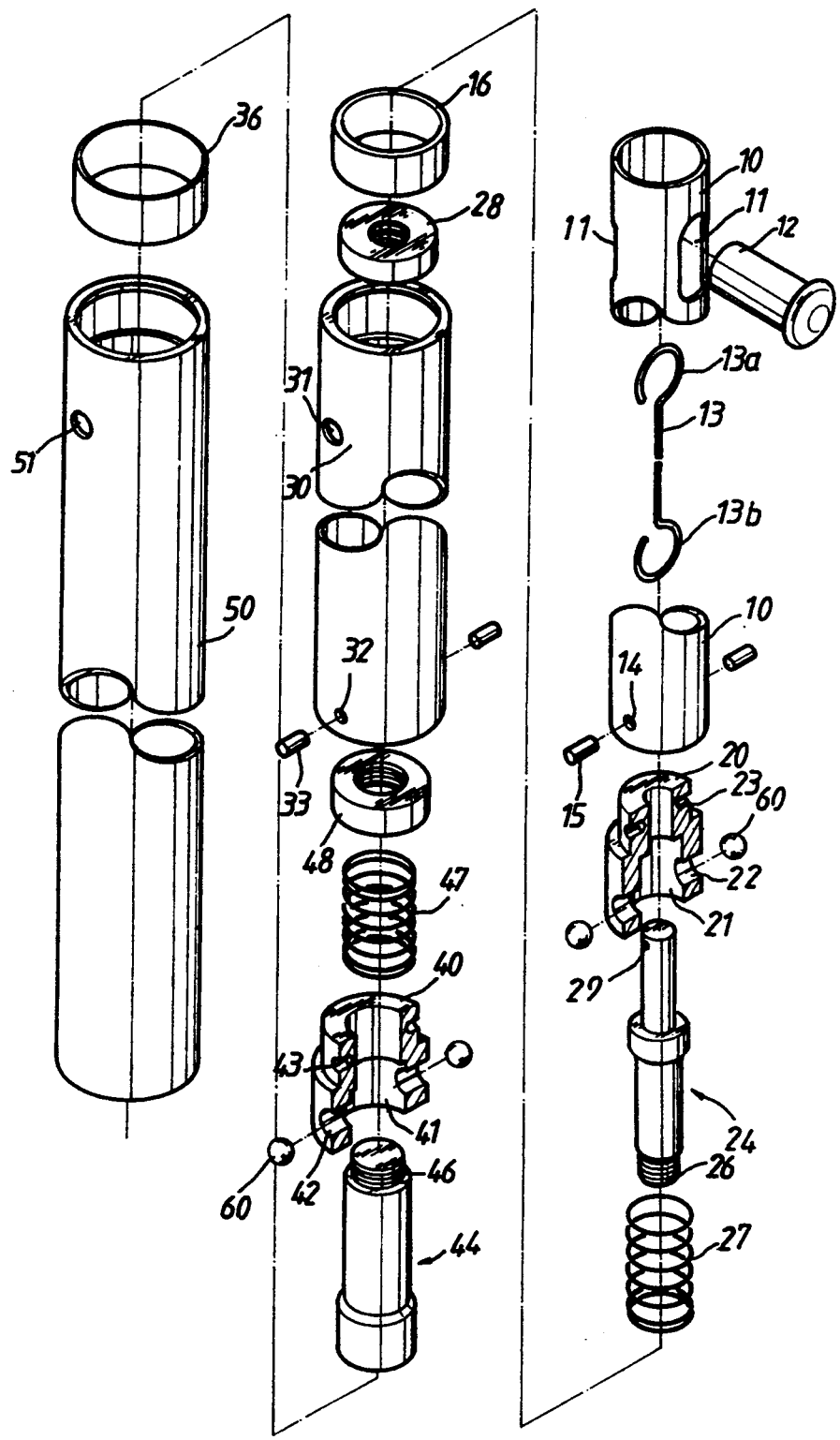
FIG. 3 is an exploded view of the telescopic handle in accordance with the preferred embodiment of the present invention.
Figure 4:
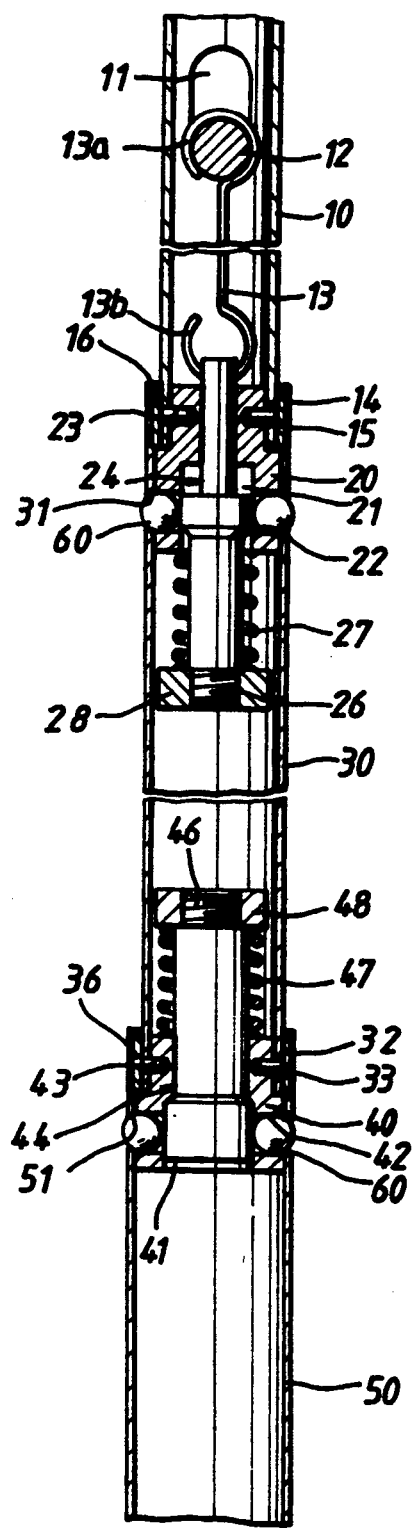
FIG. 4 is a vertical cross-sectional view of the telescopic handle in accordance with the preferred embodiment of the present invention, showing a first locking device in a first position and a second locking device in a first position.

Additionally referring to FIGS. 3 and 4 of the drawings, the first tube 10 has two slots 11 longitudinally formed therethrough near the first ends thereof and two holes 14 formed therethrough near the second ends thereof. A pulling element 13 has a first end formed as a first hook 13a and a second end formed as a second hook 13b. The pulling element 13 is substantially co-axially sited in the first tube 10 with the first hook thereof aligning with the slots 11. A bolt 12 is inserted through the slots 11 such that the first hook 13a is hooked on the bolt 12.

A first locking element 20 has a stepped cylindrical form having a first section and a second section with a diameter greater than that of the first section thereof. The first locking element 20 defines a passage 21 having a first section and a second section with a diameter greater than that of the first section thereof. Two recesses 23 are transversely formed in the first section of the first locking element 20. Two holes 22 are transversely formed through the second section of the first locking element 20.

The inner diameter of the first tube 10 is marginally larger than the diameter of the first section of the first locking element 20. The first section of the first locking element 20 is inserted in the first tube 10 through the second end of the same. Two pins 15 are inserted through the holes 14 and inserted in the recesses 23 so that the first locking element 20 is attached to the first tube 20.

A first plunger 24 has a first section integrating with a second section integrating with a third section. The first section of the first plunger 24 has a hole 29 transversely formed therethrough. The diameter of the first section of the passage 21 is marginally larger than that of the first section of the first plunger 24. The diameter of the second section of the passage 21 is marginally larger than that of the second section of the first plunger 24. The diameter of the second section of the first plunger 24 is greater than that of the third section of the same. The third section of the first plunger 24 has a first threading 26 formed thereabout.

The first section of the first plunger 24 is inserted through the first section of the passage 21. At that instant, the second section of the first plunger 24 is sited in the second section of the passage 21. The second hook 13b is inserted through the hole 29. Thus, the bolt 12 is linked to the first plunger 24. The third section of the first plunger 24 is sited through a first spring 27. A first nut 28 has a threading engaging with the first threading 26. The first spring 27 is compressed between the second section of the first locking element 20 and the first nut 28.

The second tube 30 has two holes 31 formed therein near a first end thereof and two holes 32 formed therein near a second end thereof.

Two balls 60 have a diameter marginally smaller than that of the holes 22. The diameter of the balls 60 is greater than that of the holes 31. Initially, the third section of the first plunger 24 is aligned with the holes 22 so that the balls 60 can be completely moved into the first locking element 20 and that the first locking element 20 can be inserted into the second tube 30 through the first end of the same.

A first sleeve 16 fits between the first tube 10 and the second tube 30. The first sleeve 16 encloses the first tube 10 so that the pins 15 are retained in the holes 14 and the recesses 23 and that the first tube 10 is firmly attached to the first locking element 20. The first sleeve 16 traps the second section of the first locking element 20 so that the first locking element 20 is restrained from being disengaged from the second tube 30. Accordingly, the first tube 10 is restrained from being disengaged from the second tube 30.

A second locking element 40 has a stepped cylindrical form having a first section and a second section with a diameter greater than that of the first section thereof. The second locking element 40 defines a passage 41 having a first section and a second section with a diameter greater than that of the first section thereof. Two recesses 43 are transversely formed in the first section of the second locking element 40. Two holes 42 are transversely formed through the second section of the second locking element 40.

The inner diameter of the second tube 30 is marginally larger than the diameter of the first section of the second locking element 40. The first section of the second locking element 40 is inserted in the second tube 30 through the second end of the same. Two pins 33 are inserted through the holes 32 and inserted in the recesses 43 so that the second locking element 40 is attached to the second tube 30.

A second plunger 44 has a first section integrating with a second section integrating with a third section. The first section of the second plunger 44 has a threading formed thereabout. The diameter of the first section of the passage 41 is marginally larger than that of the first section of the second plunger 44. The diameter of the second section of the passage 41 is marginally larger than that of the second section of the second plunger 44.

The first section of the second plunger 44 is inserted through the first section of the passage 41. At that instant, the second section of the second plunger 44 is sited in the second section of the passage 41. The first section of the second plunger 44 is inserted through a second spring 47. A second nut 48 has a threading engaging with the second threading 46. The second spring 47 is compressed between the first section of the second locking element 40 and the second nut 48.

The third tube 50 has two holes 51 formed therein near a first end thereof.

Two balls 60 have a diameter marginally smaller than that of the holes 42. The diameter of the balls 60 is greater than that of the holes 51. Initially, the first section of the second plunger 44 is aligned with the holes 42 so that the balls 60 can be completely sited in the second locking element 40 and that the second locking element 40 can be inserted into the third tube 50 through the first end of the same.

A second sleeve 36 fits between the second tube 30 and the third tube 50. The second sleeve 36 encloses the pins 33 so that the pins 33 are retained in the holes 32 and recesses 43 and that the second tube 30 is firmly attached to the second locking element 40. The second sleeve 36 traps the second section of the second locking element 40 so that the second locking element 40 is restrained from being disengaged from the third tube 50. Accordingly, the second tube 30 is restrained from being disengaged from the third tube 50.

Figure 2:
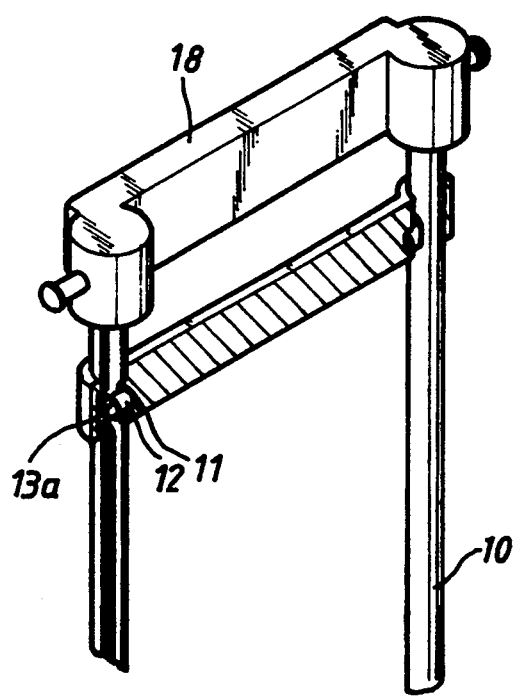
FIG. 2 is a vertical cross-sectional partial view of a telescopic handle in accordance with the preferred embodiment of the present invention.

Additionally referring to FIG. 2 of the drawings, the first tubes 10 are inserted through two tubular portions formed on two ends of a lever so that the lever is slidable relative to the tubes 10. The bolts 12 are enclosed in the lever so that the bolts 12 are manipulatable together with the lever.

As clearly shown in FIG. 4 of the drawings, the plunger 24 is biased, by means of the first spring 27, to a first position relative to the first locking element 20 so that the second section of the first plunger 24 is aligned with the holes 22. As mentioned above, the diameter of the second section of the passage 21 is marginally larger than that of the second section of the first plunger 24. Furthermore, the wall thickness of the second section of the first locking element 20 is less than the diameter of the balls 60. Accordingly, the balls 60 are kept from being pushed into the passage 21. That is, the balls 60 are retained partially in the holes 31. Thus, the first tube 10, together with the locking element 20, is kept from being further inserted into the second tube 30.

The plunger 44 is biased, by means of the first spring 47, to a first position with respect to the second locking element 41 so that the second section of the second plunger 44 is aligned with the holes 42. As mentioned above, the diameter of the second section of the passage 41 is marginally larger than that of the second section of the second plunger 44. Furthermore, the wall thickness of the second locking element 40 is less than the diameter of the balls 60. Accordingly, the balls 60 are kept from being pushed into the passage 41. That is, the balls 60 are retained partially in the holes 51. Thus, the second tube 30, together with the locking element 40, is kept from being further inserted into the third tube 50.

Figure 5:
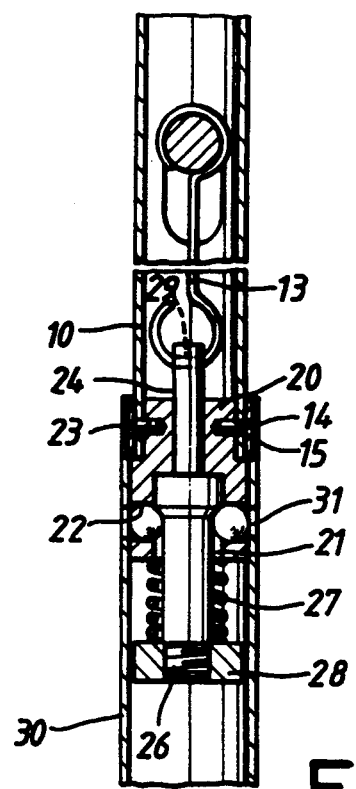
FIG. 5 is a vertical cross-sectional partial view of the telescopic handle in accordance with the preferred embodiment of the present invention, showing the first locking device in a second position.

Additionally referring to FIG. 5 of the drawings, by pulling the bolt 12 upwards, the plunger 24 is moved to a second position relative to the first locking element 20 so that the third section of the first plunger 24 is aligned with the holes 22. As the diameter of the second section of the passage 21 is greater than that of the third section of the first plunger 24, the balls 60 are allowed to be partially pushed into the passage 21. That is, the balls 60 are allowed to be moved completely away from the holes 31. Thus, the first tube 10, together with the first locking element 20, is allowed to be further pushed into the second tube 30.

Figure 6:
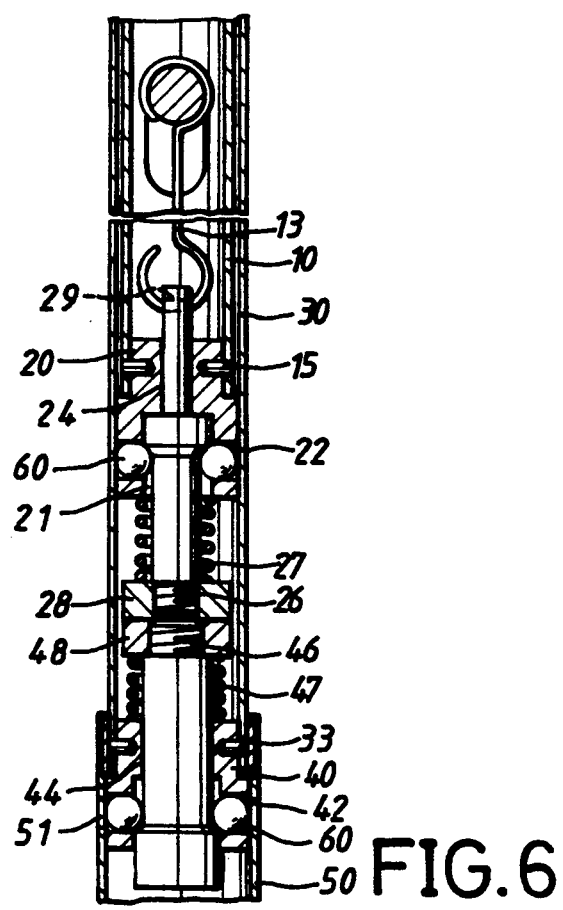
FIG. 6 is a vertical cross-sectional partial view of the telescopic handle in accordance with the preferred embodiment of the present invention, showing the first locking device in a second position and the second locking device in a second position.

Additionally referring to FIG. 6 of the drawings, if the first tube 10 is moved into the second tube 30 to the maximum extent, the first plunger 24 pushes the second plunger 44 to a second position with respect to second locking element 40 so that the first section of the second plunger 44 is aligned with the holes 42. As the diameter of the second section of the passage 41 is greater than that of the first section of the second plunger 44, the balls 60 are allowed to be partially pushed into the passage 41. That is, the balls 60 are allowed to be moved completely away from the holes 51. Thus, the second tube 30, together with the second locking element 40, is allowed to be further pushed into the third tube 50.

Although the device for connecting the first tube 10 with the second tube 30 slightly differs from the device for linking the second tube 30 to the third tube 50 in the preferred embodiment shown in the drawings, the devices can be identical. That is, the device for connecting the first tube 10 to the second 30 can be used for linking the second tube 30 to the third tube 50. The device for connecting the second tube 30 to the third tube 50 can be used for linking the first tube 10 to the second tube 30.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A telescopic handle for carts, comprising:
    a first tube comprising two opposing slots longitudinally formed therethrough near one end thereof;
    a second tube comprising two holes formed therethrough near one end thereof;
    a locking element comprising a first section attached in said first tube and a relatively large second section attached in said second tube, said second section of said locking element comprising two holes transversely formed therethrough, said holes formed through said locking element comprising a diameter greater than that of said holes formed through said second tube;
    a passage being axially formed through said locking element and comprising a first section and a relatively large second section;
    a plunger comprising a first section being insertable through said first section of said passage, a second section comprising a cross-sectional profile being marginally smaller than that of said second section of said passage and a third section comprising a cross-sectional profile being smaller than that of said second section of said passage;
    a nut attached to said third section of said plunger;
    a spring mounted on said third section of said plunger so that said spring is compressed between said locking element and said nut;
    a bolt being insertable through said slots;
    a pulling element linking said bolt to said first section of said plunger;
    two balls being respectively sited in said holes formed through said locking element and comprising a diameter greater than the wall thickness of said second section of said locking element;
    said plunger being biasable, by means of said spring, to a first position relative to said locking element so that said second section of said plunger is aligned with said holes formed through said locking element for pushing said balls partially into said holes formed in said second tube, thereby retaining said first tube relative to said second tube;
    said plunger being moveable, by pulling said bolt upwards, to a second position with respect to said locking element so that said third section of said plunger is aligned with said holes formed through said locking element for allowing said balls to be pushed partially into said holes formed through said locking element, thereby allowing said first tube to be further inserted into said second tube.

2. A telescopic handle in accordance with claim 1, wherein said first tube comprises two holes formed therethrough and said first section of said locking element comprises two recesses transversely formed therein, two pins being respectively insertable through said holes formed through said first tube and received in said recesses formed in said first section of said locking element.

3. A telescopic handle in accordance with claim 1, wherein said first section of said plunger comprises a hole transversely formed therethrough and said pulling element comprises a first hook hooked on said bolt and a second hook inserted through said holes formed through said first section of said plunger.

4. A telescopic handle for carts, comprising:
    a first tube comprising two opposing slots longitudinally formed therethrough near a first end thereof;
    a second tube comprising two ball-receiving holes formed therethrough near a first end thereof;
    a third tube comprising two ball-receiving holes formed therethrough near one end thereof;
    a first locking element comprising a first section and a relatively large second section comprising two holes transversely formed therethrough, said holes formed through said first locking element comprising a diameter greater than that of said ball-receiving holes formed through said second tube;
    a passage being axially formed through said first locking element and comprising a first section and a relatively large second section;
    a first plunger comprising a first section being insertable through said first section of said passage formed through said first locking element, a second section comprising a cross-sectional profile being marginally smaller than that of said second section of said passage formed through said first locking element and a third section comprising a cross-sectional profile being smaller than that of said second section of said passage formed through said first locking element;
    a first nut attached to said third section of said first plunger;
    a first spring mounted on said third section of said first plunger so that said first spring is compressed between said second section of said first locking element and said first nut;

a first bolt being insertable through said slots formed through said first tube;

a first pulling element linking said first bolt to said first section of said first plunger;

two first balls being respectively sited in said holes formed through said first locking element and comprising a diameter greater than the wall thickness of said second section of said first locking element;

a second locking element comprising a first section and a relatively large second section comprising two holes transversely formed therethrough, said holes formed through said second locking element comprising a diameter greater than that of said ball-receiving holes formed through said second tube;

a passage being axially formed through said second locking element and comprising a first section and a relatively large second section;

a second plunger comprising a first section being insertable through said first section of said passage formed through said second locking element and a second section comprising a cross-sectional profile being marginally smaller than that of said second section of said passage formed through said second locking element;

a second nut attached to said first section of said second plunger;

a second spring mounted on said first section of said second plunger so that said second spring is compressed between said first section of said second locking element and said second nut;

two second balls being respectively sited in said holes formed through said second locking element and comprising a diameter greater than the wall thickness of said second section of said second locking element;

said first plunger being biasable, by means of said first spring, to a first position relative to said first locking element so that said second section of said first plunger is aligned with said holes formed through said first locking element for pushing said first balls partially into said ball-receiving holes formed in said second tube, thereby retaining said first tube relative to said second tube;

said first plunger being moveable, by pulling said bolt upwards, to a second position with respect to said first locking element so that said third section of said first plunger is aligned with said holes formed through said first locking element for allowing said first balls to be pushed partially into said holes formed through said first locking element, thereby allowing said first tube to be further inserted into said second tube;

said second plunger being biasable, by means of said second spring, to a first position relative to said second locking element so that said second section of said second plunger is aligned with said holes formed through said second locking element for pushing said second balls partially into said holes formed in said third tube, thereby retaining said second tube relative to said third tube;

when the first plunger is in the second position, the first tube is insertable into said second tube so that said third section of the first plunger pushes the first section of the second plunger to a second position with respect to said second locking element so that said first section of said second plunger is aligned with said holes formed through said second locking element for allowing said second balls to be pushed partially into said holes formed through said locking element, thereby allowing said second tube to be further inserted into said third tube.

5. A telescopic handle in accordance with claim 4, wherein said first tube comprises two holes formed therethrough near a second end thereof and said first section of said first locking element comprises two recesses transversely formed therein, two first pins being respectively insertable through said holes formed through said first tube and received in said recesses formed in said first section of said first locking element.

6. A telescopic handle in accordance with claim 4, wherein said second tube further comprises two pin-receiving holes formed therethrough near a second end thereof and said first section of said second locking element comprises two recesses transversely formed therein, two second pins being insertable through said pin-receiving holes formed through said second tube and received in said recesses formed in said first section of said second locking element.

* * * * *